June 14, 1966 L. D. KESLAR ETAL 3,255,567
METHOD AND APPARATUS FOR TREATING MULTIPLY ASSEMBLIES
Filed Aug. 2, 1962 2 Sheets-Sheet 1
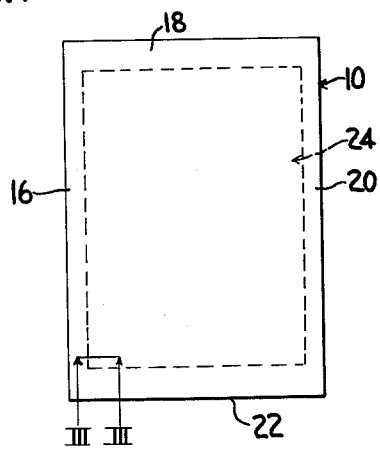
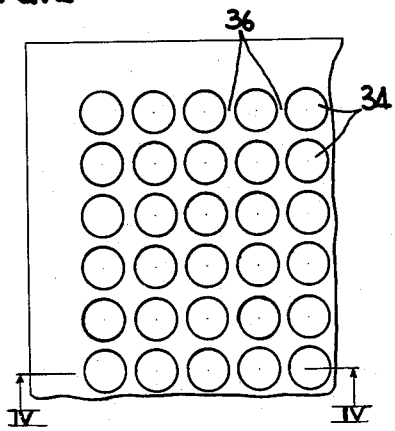
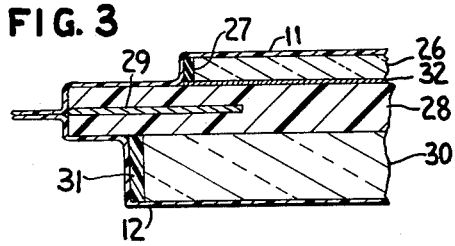
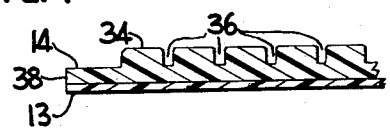
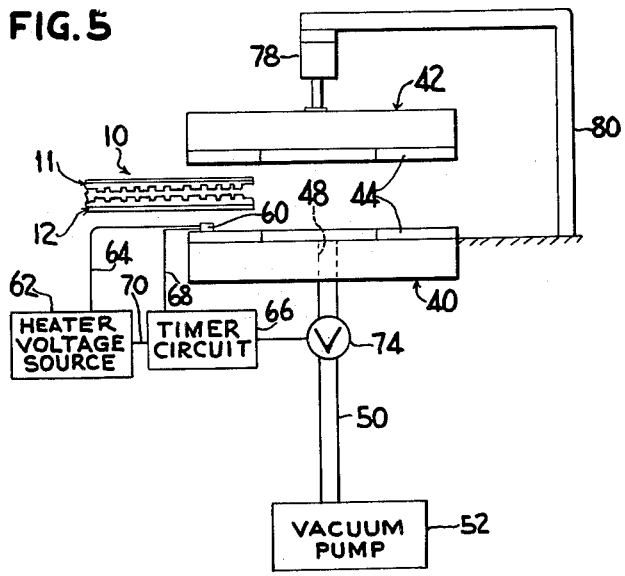
INVENTORS
LEROY D. KESLAR and
JOHN S. RANKIN
BY
Oscar L. Spencer
ATTORNEY June 14, 1966   L. D. KESLAR ETAL   3,255,567
METHOD AND APPARATUS FOR TREATING MULTIPLY ASSEMBLIES
Filed Aug. 2, 1962

INVENTORS
LEROY D. KESLAR and
JOHN S. RANKIN
BY Oscar L. Spencer
ATTORNEY

United States Patent Office 3,255,567
Patented June 14, 1966

3,255,567
METHOD AND APPARATUS FOR TREATING MULTIPLY ASSEMBLIES
Leroy D. Keslar, Natrona Heights, and John S. Rankin, Belle Vernon, Pa., assignors to Pittsburgh Plate Glass Company, Pittsburgh, Pa., a corporation of Pennsylvania
Filed Aug. 2, 1962, Ser. No. 214,360
8 Claims. (Cl. 53—22)

This application relates to method and apparatus for treating multiply assemblies and, while applicable for any lamination of multiply assemblies within an enclosed bag, particularly relates to improvements in evacuating and sealing a laminating bag used for laminating aircraft glazing units.

Laminated glazing units for aircraft are precision units and fabricated on an individual basis. Each multiply assembly of glass and plastic sheets is carefully assembled and inserted within a flexible bag, the bag is evacuated and sealed with the assembly completely enclosed within the bag. Practically every step in the fabrication and subsequent testing operation is performed manually. Hence, any step that can be performed by an automatic rather than manual operation that does not harm the efficiency of the resulting product improves the efficiency of the operation. The present invention eliminates an expensive and time-consuming step and substitutes an easily accomplished operation.

In the past, the bag used for laminating multiply assemblies was sealed manually employing heated irons to seal the access opening of the bag through which the bag was evacuated. This resulted in a needless time-consuming and labor-wasting operation. The present invention provides an automatic means for evacuating and heat sealing a bag that encloses a multiply glass-plastic assembly during lamination in an autoclave to produce an aircraft glazing unit.

The present invention employs a bag comprising walls, each of a thin, flexible, outer layer of polyethylene glycol terephthalate, commonly known as Mylar, and an inner layer of polyethylene having an embossed inner surface to hold a glass-plastic assembly to be fabricated into a laminated glazing assembly for aircraft. The bag is sealed on three sides and its access opening rests on an electric heating element. The heating element rests on the lower jaw of a pair of jaws provided with gasket means forming a sealed chamber surrounding the access opening of the bag. Evacuation means comprising an evacuation pipe communicates with the sealed chamber through an opening in the lower jaw to evacuate air and other gases entrapped within the flexible bag. The embossing on the interior surfaces of the polyethylene inner layer of the bag provides passages to enhance the escape of the entrapped gases from within the flexible bag.

A pressure actuated switch is contained within the evacuation pipe. When the pressure within the bag and the sealed chamber surrounding the access opening to the bag is reduced below a predetermined value, the pressure actuated switch responds to actuate a timer circuit. The latter actuates a voltage supply source electrically connected to the electric heating element after a predetermined time delay during which time the vacuum source continues to operate to evacuate the thin flexible bag. The electric heating element is a thin flat strip of Nichrome wire having the characteristic of heating to a temperature sufficient to seal the polyethylene inner walls of the access opening of the bag in a very short time, on the order of 3 to 6 seconds. The timer circuit also includes means for disconnecting the voltage supply source after the electric heating element has been heated for sufficient time to insure that the access opening of the thin flexible bag is heat sealed.

In order to insure that the heating element is not wrinkled, whereby wrinkling the bag in the region of its access opening, springs or other tensioning means are attached to the extremities of the electrical heating element in order to maintain the latter in tension. This tension force keeps the electric heating element flat and does not permit it to wrinkle even though the electric heating element expands due to thermal expansion when it is energized.

A typical illustrative embodiment of the present invention will now be described to provide a complete understanding thereof.

In the drawings which form part of the present disclosure and wherein like reference numerals are applied to like structural elements, FIG. 1 is a plan view of a bag showing a multiply assembly inserted therein;

FIG. 2 is an enlarged fragmentary view of an inner surface of a wall of the bag of FIG. 1;

FIG. 3 is a fragmentary enlarged cross-section of a portion of the bag through a portion of an assembly inserted therein, and taken along the lines III—III of FIG. 1;

FIG. 4 is an enlarged fragmentary cross-sectional view of a wall of the bag of FIG. 1 taken along the lines IV—IV of FIG. 2;

FIG. 5 is an exploded fragmentary sectional view of the evacuating and sealing means of the present invention, including a schematic circuit diagram of an electrical control circuit which energizes an electrical resistance element which is part of the apparatus illustrated;

Figure 6:
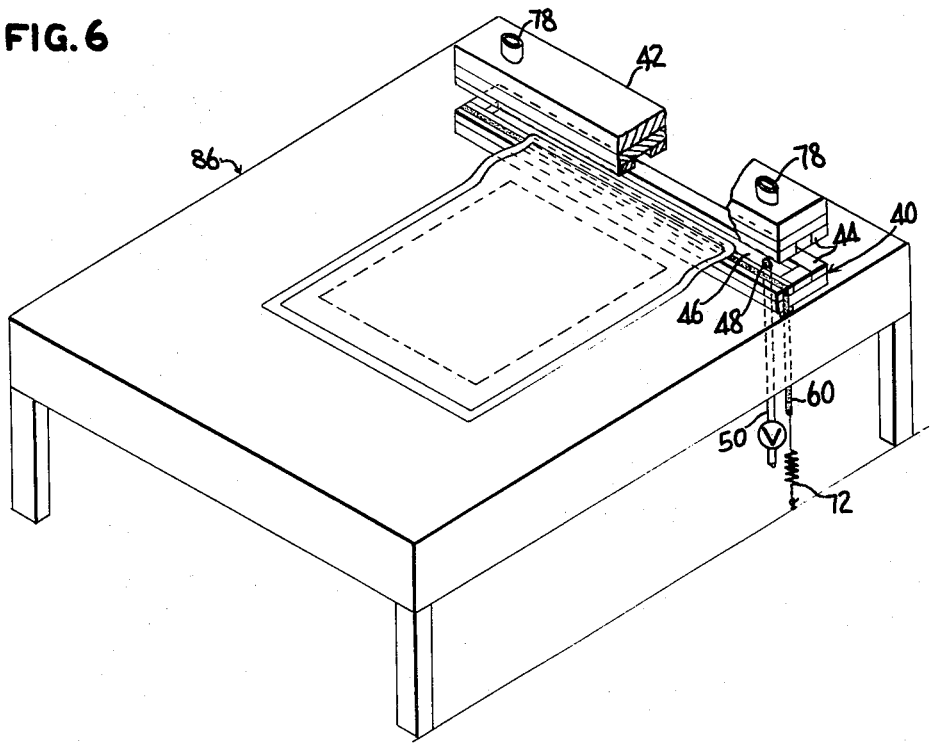
FIG. 6 is an isometric view of a preferred embodiment of the present invention illustrating the novel evacuating and sealing means of the present invention in position to perform its function.

The drawings show a thin, flexible bag 10 of substantially rectanguler outline. The bag is formed of a lower wall 12 and an upper wall 11, each of heat-sealable material. Each wall of the illustrated embodiment comprises an outer ply 13 of polyethylene glycol terephthalate, commonly known as Mylar, and in inner ply 14 of polyethylene bonded thereto. The inner ply 14 of the lower wall of the bag 10 is sealed to the inner ply 14 of the upper wall of the bag 10 along the complete length of three marginal borders 16, 18, and 20 leaving an acess opening 22 along the fourth marginal edge of the bag.

FIG. 3 shows a typical multiply assembly 24 within the bag 10. The assembly 24 is composed of a thin glass sheet 26 surrounded by a thin rubber frame 27, a plastic interlayer 28 of polyvinyl butyral reinforced with a metal insert 29 and a thick glass sheet 30 surrounded by a frame 31 of phenolic resin. The inner surface of the thin glass sheet 26 is covered with a thin transparent electroconductive coating 32 of tin oxide. The present disclosure will described operating conditions for treating an assembly 48 inches by 36 inches in outline whose glass sheets have a nominal thickness of 3/16 inch and 1/2 inch, respectively, and whose plastic interlayer is about 3/8 inch thick and whose edge is located about 1/2 inch beyond the margin of the thicker sheet and about 1 inch beyond that of the coated sheet.

Each inner ply 14 of polyethylene is embossed along its inner surface to form a checkerboard pattern of rounded protuberances 34 on the inner surface thereof. In a typical construction, the Mylar outer ply 13 is about .001 inch thick and the polyethylene inner ply is about .0035 inch thick. Each protuberance is about .030 inch in diameter with grooves 36 providing a minimum space between adjacent protuberances of about .005 inch. The minimum depth of the grooves between protuberances is about .002 inch, leaving a base 38 for the inner ply 14 about .0015 inch thick. Grooves 36 provide a plurality of passageways for the escape of gas entrapped within the bag 10 when the latter is evacuated.

The evacuating and sealing apparatus of the present invention comprises a lower jaw 40 and an upper jaw 42. Each jaw is about 2¾ inches wide and 50 inches long. The lower surface of the upper jaw 42 and the upper surface of the lower jaw 40 are each provided with a frame 44 of gasket sealing strips of an air impervious material such as a silicon, neoprene, sponge rubber or the like. The sealing strips 44 enclose an elongated sealed chamber 46 communicating with the access opening 22 of the bag 10. In a typical embodiment, strips of closed cell sponge rubber ¾ inch wide and ⅛ inch thick having an A Shore durometer rating of 25 were used, with a range of 20 to 30 acceptable.

An aperture 48 is provided in the lower jaw 40 intermediate the sealing strips 44. An evacuation pipe 50 extends from the aperture 48 to an evacuation pump 52.

When the bag 10 is properly placed with its access opening 22 entirely within the sealed chamber 46, the evacuation pump 52 causes the removal of air and other gases from within the envelope 10 through the access opening 22, sealed chamber 46, aperture 48 and evacuation pipe 50 until the thin, flexible bag conforms to the shape of the assembly inserted therewithin.

At this time, the bag 10 is ready to be heat-sealed. Apparatus for heat-sealing the access opening comprises a Nichrome ribbon electrical resistance element 60 connected to a voltage source 62 through a lead wire 64, to a timer circuit 66 through another lead wire 68 and through an additional lead wire 70 coupling the timer circuit 68 and the voltage source 62.

The electrical heating element 60 is stretched by attaching each end thereof to a tension spring 72 whose other end is attached to an insulated fixture (not shown). This stretching keeps the electric heating element 60 flat even when it expands thermally when energized. If the element 60 were not stretched, it would tend to wrinkle and spoil the contour of the bag 10 at its critical region, its access opening 22.

The timer circuit 66 is coupled to a pressure actuated switch 74 located within the evacuation pipe 50. The switch 74 is constructed to respond to a predetermined pressure level in the evacuation pipe 50.

In a typical operation, when the pressure in the evacuation pipe is reduced to an evacuated state of about 27 inches of mercury below normal atmospheric pressure, switch 74 actuates the timer circuit 66. The latter in turn actuates the heater voltage source 62 after a delay of ten seconds. A number 34 Nichrome ribbon ¼ inch wide, .012 inch thick and 5 feet long used as electric heating element 60 was actuated for a period of 4 seconds using a voltage source 62 of 18 volts to provide a heat of about 200 watts per foot length of heating element. A suitable range for sealing the bag is 150 to 250 watts per foot length with the time of application ranging from 6 seconds to 3 seconds, respectively. More time is needed for a smaller power input than for a larger power input.

At the end of the heating cycle, the assembly 24 was completely sealed within the bag 10. The evacuation pump 52 was stopped and the upper jaw 42 raised from contact with the lower jaw 40. In order to facilitate lifting and lowering the upper jaw, a number of air cylinders 78 are supported on a support structure 80.

Figure 7:
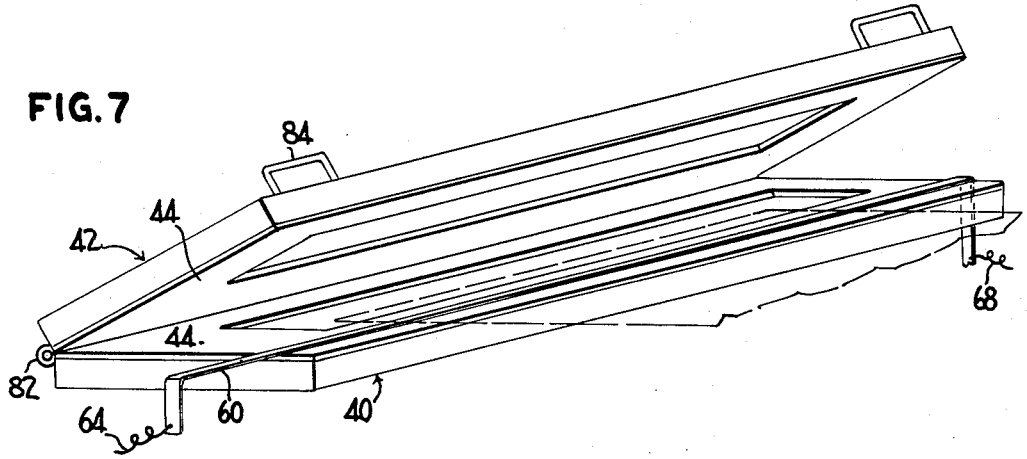
FIG. 7 is an isometric view of an alternative embodiment of apparatus according to the present invention.

FIG. 7 shows an alternate embodiment of the invention in which the upper jaw 42 is pivoted to the lower jaw 40 about hinge means 82 at the outer end of the jaws. Handles 84 are attached to the upper wall of upper jaw 42 to facilitate its pivoting into an open position to receive a bag for loading, evacuation and sealing and for pivoting into a closed position to form the sealed chamber 46.

Either of the above embodiments may be mounted on a support table 86, the upper surface of which supports the bag in a horizontal plane.

The present invention suggests employing the following methods to prepare multiply assemblies for lamination under heat and pressure. The plies of the assembly to be laminated to one another are superimposed upon one another in their desired configuration and assembled with their frames. The assembled plies are then placed upon an embossed surface of a layer of a thin flexible material of greater extent than said assembly and below an embossed surface of another layer of thin, flexible material. Three marginal sides of the bag extending beyond the assembly are heat-sealed to produce a bag having an access opening along its fourth side. As an alternative, the bag is first formed with the access opening by mounting the upper and lower walls with their embossed polyethylene surfaces facing one another, sealing three marginal edges of the walls to one another and inserting the assembly within the bag through the access opening for evacuation and sealing.

A thin strip of electric resistance material is placed on a strip of gasket material surrounding the lower jaw. The bag is mounted above the lower jaw and the strip. The access opening of the bag is placed beyond the strip of electrical resistance material and in communication with the area surrounded by the gasket material. Air cylinders 78 are actuated to lower the upper jaw 42 into position wherein its frame of gasket material 44 is aligned with the frame of the lower jaw 40, thus forming the sealed chamber 46.

The bag is evacuated by evacuating the sealed chamber. When the pressure within the bag and its evacuating system reaches a vacuum of 27 inches of mercury, the timer circuit 66 is energized to cause the voltage source 62 to energize the electrical heater 60 after a time delay of 10 seconds. Evacuation of the bag continues during this time delay and during the subsequent heating operation (200 watts per inch for 4 seconds). At the end of this time, the assembly is sealed within the evacuated bag, the walls of the bag conform to the shape of the assembly and the bag and its contents are ready for lamination under heat and pressure in an autoclave.

It is sometimes necessary to wrap the assembled unit in cellophane or other parting material to prevent the polyethylene from adhering to some component of the assembly during its lamination in an autoclave. For products requiring further edgework after lamination, a polyethylene backed tape is wrapped around the edges of the unit before the latter is inserted within the bag. After autoclave pressing, the bag is cut off at the edges of the unit and is left adhered to the tape on the surfaces of the unit when it serves as a protective coating to prevent its becoming scratched during edging.

Other materials other than Mylar—polyethylene samples—have been used sucessfully as bags. Any material of sufficient thinness to conform readily to the shape of the assembled unit that offers adequate resistance to damage from handling and to the autoclave fluids is acceptable. Nylon film with an embossed inner coating of polyethylene has been used successfully as a bag material.

While the process and apparatus described above has particular utility in preparing glass-plastic assemblies for lamination, it is also suitable for preparing assemblies of other materials for lamination and has been employed in preparing transparent all-plastic units for lamination into plastic glazing closures.

The form of the invention shown and described herein represents an illustrative preferred embodiment and certain modifications thereof. It is understood that various changes may be made without departing from the spirit of the invention as defined in the claimed subject matter which follows.

What is claimed is:

1. Apparatus for preparing multiply assemblies for lamination within a thin flexible bag of heat sealable material enclosed on three sides and having on its fourth side an access opening adapted to receive a multiply assembly to be laminated, the interior surfaces of said bag being embossed to provide passageways therebetween for the escape of air and other gases within said bag, said apparatus comprising upper and lower jaws and gasket means carried around the periphery of said upper and lower jaws, an electrical heating element disposed between said jaws, means providing relative motion between said upper and lower jaws to enclose said access opening and said electrical heating element between said jaws and to form a sealed chamber between said jaws communicating with the access opening of said bag, evacuation means communicating with said sealed chamber, said evacuation means comprising an evacuation pipe, a pressure actuated switch within said evacuation means, a timer circuit actuated by said pressure actuated switch when said pressure within said evacuation means reaches a predetermined level, a voltage supply source connected to said heating element and responsive to said timer circuit to energize said heating element for a predetermined time cycle after said pressure actuated switch is actuated in response to a drop in pressure within said evacuation means below said predetermined level.

2. Apparatus as in claim 1, further including tension means supporting said heating element in continuous tension so as to avoid wrinkling of said heating element when its temperature rises upon electrical energization thereof.

3. Apparatus as in claim 1 wherein said upper jaw is pivotally attached to said lower jaw at a wall forming an outer wall of said sealed chamber when said upper jaw is pivoted so that its free end is in juxtaposition to the free end of said lower jaw.

4. A method of preparing a multiply assembly for lamination comprising superimposing the plies of the assembly to be laminated upon one another in a desired configuration, placing the assembly upon an embossed surface of a layer of a thin flexible material of greater extent than said assembly, and below an embossed surface of a layer of said material of greater extent than said assembly, heat sealing three marginal sides of the layers extending beyond the margin of said assembly, leaving the fourth side of the bag thus formed open, placing the bag on a thin strip of electric resistance material supported on a jaw surrounded by a frame of gasket material with its access opening beyond said strip of electric resistance material and within said frame of gasket material, placing another jaw surrounded by a frame of gasket material above the first jaw with the frames of gasket material in alignment, whereby said frames of gasket material form a sealed chamber surrounding the access opening, evacuating said bag through said access opening and along passageways provided by the embossed surfaces of said bag by evacuating said sealed chamber, and when the pressure within said sealed chamber is reduced to a predetermined amount, energizing said strip of electrical resistance material for a period of time sufficient to heat-seal said access opening while continuing said evacuation, deenergizing said electrical heating element, discontinuing said evacuation, removing said jaws from said bag and removing said bag for subsequent lamination under heat and pressure.

5. The method according to claim 4 in which a thin sheet of parting material is inserted between the outer surfaces of the assembly to be laminated and the embossed interior surfaces of said bag.

6. The method according to claim 4, wherein a pressure sensitive tape is wrapped around the edge of the assembly before the latter is surrounded by the bag and the bag is left adhered to the major surfaces of the unit during working subsequent to completing the lamination.

7. The method according to claim 4 wherein the top and bottom layers are formed into a bag having an access opening before inserting the assembly to be laminated through said access opening.

8. A method of preparing a multiply assembly for lamination comprising superimposing the plies of the assembly to be laminated upon one another in a desired configuration, enclosing the assembly within a heat sealable flexible bag having embossed interior surfaces while leaving an access opening, placing the bag on a heating element that is supported on a jaw surrounded by a frame of gasket material with its access opening beyond said heating element and within said frame of gasket material, placing another jaw surrounded by a frame of gasket material above the first jaw with the frames of gasket material in alignment to form a sealed chamber surrounding the access opening, evacuating said bag through said access opening and along passageways provided by the embossed interior surfaces of said bag by evacuating said sealed chamber and, when the pressure within said sealed chamber is reduced to a predetermined amount, energizing said heating element for a period of time sufficient to heat seal said access opening while continuing said evacuation.

References Cited by the Examiner

UNITED STATES PATENTS

| | | | |
|---|---|---|---|
| 2,740,243 | 4/1956 | Mahaffy | 53—95 |
| 2,780,350 | 2/1957 | Simon et al. | 53—36 X |
| 2,838,894 | 6/1958 | Paikens et al. | 53—112 X |
| 2,875,070 | 4/1959 | Rockland et al. | 53—22 X |
| 2,949,715 | 8/1960 | Tarleton et al. | 53—112 |
| 2,953,877 | 9/1960 | Chapman et al. | 53—22 |
| 2,963,838 | 12/1960 | Harrison et al. | 53—112 X |
| 2,978,008 | 4/1961 | Conti | 53—22 X |
| 2,984,055 | 5/1961 | Piazze et al. | 53—22 |
| 3,020,686 | 2/1962 | Rueckert et al. | 53—22 |
| 3,030,747 | 4/1962 | Karpowicz | 53—112 |

TRAVIS S. McGEHEE, *Primary Examiner.*